(12) United States Patent
Ishiguro et al.

(10) Patent No.: US 12,095,326 B2
(45) Date of Patent: Sep. 17, 2024

(54) INTER-PHASE INSULATING PAPER, MOTOR, AND ASSEMBLY METHOD FOR INTER-PHASE INSULATING PAPER

(71) Applicant: NISSAN MOTOR CO., LTD., Yokohama (JP)

(72) Inventors: Kunitomo Ishiguro, Kanagawa (JP); Takanori Ishikawa, Kanagawa (JP); Daigo Iwasaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/696,165

(22) PCT Filed: Sep. 30, 2021

(86) PCT No.: PCT/JP2021/036100
§ 371 (c)(1),
(2) Date: Mar. 27, 2024

(87) PCT Pub. No.: WO2023/053329
PCT Pub. Date: Apr. 6, 2023

(65) Prior Publication Data
US 2024/0266897 A1   Aug. 8, 2024

(51) Int. Cl.
*H02K 3/34* (2006.01)
(52) U.S. Cl.
CPC .............. *H02K 3/34* (2013.01); *H02K 3/345* (2013.01)
(58) Field of Classification Search
CPC .................................. H02K 3/34; H02K 3/345

USPC ......................................................... 310/179
See application file for complete search history.

(56) References Cited

U.S. PATENT DOCUMENTS

| | | | | |
|---|---|---|---|---|
| 5,659,219 | A * | 8/1997 | Momose | H02K 15/105 310/260 |
| 2004/0183391 | A1 * | 9/2004 | Kimura | H02K 3/345 310/260 |
| 2009/0079291 | A1 * | 3/2009 | Horiba | H02K 3/34 310/215 |
| 2009/0079292 | A1 * | 3/2009 | Horiba | H02K 3/38 310/215 |
| 2009/0108696 | A1 * | 4/2009 | Horiba | H02K 3/38 310/215 |

(Continued)

FOREIGN PATENT DOCUMENTS

| | | |
|---|---|---|
| CN | 102480177 A | 5/2012 |
| JP | S61-068657 U | 5/1986 |

(Continued)

*Primary Examiner* — Rashad H Johnson
(74) *Attorney, Agent, or Firm* — Foley & Lardner LLP

(57) ABSTRACT

An inter-phase insulating paper, including: a plurality of insulating papers arranged in a stator core in a manner of circulating in a circumferential direction and configured to perform inter-phase insulation of each phase coil provided in the stator core, wherein the insulating paper includes a pair of leg portions to be respectively inserted into a pair of slots among a plurality of slots formed in the stator core, and a pair of flat portions connected to the pair of leg portions and protruding from both end surfaces of the stator core in an axial direction to perform the inter-phase insulation of each phase coil, and the pair of leg portions are connected to a central portion of an edge of the flat portion.

8 Claims, 16 Drawing Sheets

(56) References Cited

U.S. PATENT DOCUMENTS

| | | | | |
|---|---|---|---|---|
| 2009/0189476 | A1* | 7/2009 | Takizawa | H02K 3/38 |
| | | | | 310/215 |
| 2012/0133238 | A1* | 5/2012 | Shoji | H02K 3/34 |
| | | | | 310/214 |
| 2014/0127055 | A1* | 5/2014 | Horiba | F04C 23/02 |
| | | | | 417/410.5 |
| 2015/0280503 | A1* | 10/2015 | Takahashi | H02K 3/50 |
| | | | | 310/201 |
| 2017/0294816 | A1* | 10/2017 | Ren | H02K 15/10 |
| 2018/0175693 | A1* | 6/2018 | Mitsui | H02K 3/345 |
| 2018/0205300 | A1* | 7/2018 | Okada | H01B 3/52 |
| 2018/0233982 | A1* | 8/2018 | Iwaki | H02K 3/345 |
| 2018/0254681 | A1* | 9/2018 | Hashimoto | H02K 3/48 |
| 2020/0295619 | A1 | 9/2020 | Mitsui | |
| 2021/0249926 | A1* | 8/2021 | Enomoto | H02K 3/50 |

FOREIGN PATENT DOCUMENTS

| | | |
|---|---|---|
| JP | S62-168760 U | 10/1987 |
| JP | H05-055748 U | 7/1993 |
| JP | 2007-060819 A | 3/2007 |
| JP | 2020-150683 A | 9/2020 |
| JP | 2020-178476 A | 10/2020 |

* cited by examiner

INTER-PHASE INSULATING PAPER, MOTOR, AND ASSEMBLY METHOD FOR INTER-PHASE INSULATING PAPER

TECHNICAL FIELD

The present invention relates to an inter-phase insulating paper, a motor, and an assembly method for the inter-phase insulating paper.

BACKGROUND ART

JP 2007-60819 A discloses that in a three-phase motor, an inter-phase insulating paper for securing insulation between a U phase and a V phase, an inter-phase insulating paper for securing insulation between the V phase and a W phase, and an inter-phase insulating paper for securing insulation between the W phase and a U phase are individually provided, and the inter-phase insulating papers are individually mounted on slots of a stator core.

SUMMARY OF INVENTION

However, in JP 2007-60819 A, the individually provided inter-phase insulating papers are sequentially mounted on the slots of the stator core, and thus in the inter-phase insulating paper mounted first, a force is generated to push out the inter-phase insulating paper to be mounted later to an inner peripheral side of the stator core, and it is difficult to mount the inter-phase insulating papers.

An object of the present invention is to provide an inter-phase insulating paper that can be easily mounted on a slot of a stator core, a motor including the inter-phase insulating paper, and an assembly method for the inter-phase insulating paper.

An inter-phase insulating paper according to one embodiment of the present application is an inter-phase insulating paper, including: a plurality of insulating papers arranged in a stator core in a manner of circulating in a circumferential direction and configured to perform inter-phase insulation of each phase coil provided in the stator core, wherein the insulating paper includes a pair of leg portions to be respectively inserted into a pair of slots among a plurality of slots formed in the stator core, and a pair of flat portions connected to the pair of leg portions and protruding from both end surfaces of the stator core in an axial direction to perform the inter-phase insulation of each phase coil, and the pair of leg portions are connected to a central portion of an edge of the flat portion.

BRIEF DESCRIPTION OF DRAWINGS

FIG. 3A is a diagram illustrating insulating papers constituting an inter-phase insulating paper of a comparative example, in which FIG. 3A is a plan view of the insulating paper of the comparative example.

FIG. 3B is a diagram illustrating insulating papers constituting an inter-phase insulating paper of a comparative example, in which FIG. 3B is a diagram showing a case where the insulating paper of the comparative example pops out of a slot by itself when the insulating paper is inserted into the stator core.

FIG. 3C is a diagram illustrating insulating papers constituting an inter-phase insulating paper of a comparative example, in which FIG. 3C is a diagram showing a case where when the insulating papers of the comparative example are inserted into the stator core, the insulating paper inserted later pops out of a slot due to a force from the insulating paper inserted first.

FIG. 5A is a diagram showing an assembly process of the inter-phase insulating paper of the present embodiment, in which FIG. 5A is a diagram showing a state in which U phase coils and the insulating papers on an outer peripheral side are mounted.

FIG. 5B is a diagram showing an assembly process of the inter-phase insulating paper of the present embodiment, in which FIG. 5B is a diagram of a flat portion of the insulating paper on the outer peripheral side viewed from an axial direction.

FIG. 6A is a diagram showing the assembly process of the inter-phase insulating paper of the present embodiment, in which FIG. 6A is a diagram showing a state in which V phase coils are mounted on slots into which leg portions of the insulating papers on the outer peripheral side are inserted, and leg portions of the insulating papers on an inner peripheral side are inserted into slots on which W phase coils are to be mounted.

FIG. 6B is a diagram showing the assembly process of the inter-phase insulating paper of the present embodiment, in which FIG. 6B is a diagram of a flat portion of the insulating paper on the inner peripheral side viewed from the axial direction.

FIG. 9A is a diagram (reproduction) showing the assembly process of the inter-phase insulating paper of the present embodiment, and shows a state in which the insulating papers on the outer peripheral side and the V phase coils are bent to an outer peripheral side of the stator core after the V phase coils are mounted on the slots, in which FIG. 9A shows a case where the flat portion does not have an arc portion.

FIG. 9B is a diagram (reproduction) showing the assembly process of the inter-phase insulating paper of the present embodiment, and shows a state in which the insulating papers on the outer peripheral side and the V phase coils are bent to an outer peripheral side of the stator core after the V phase coils are mounted on the slots, in which FIG. 9B shows a case where the flat portion has arc portions.

FIG. 10A is a diagram (reproduction) showing the assembly process of the inter-phase insulating paper of the present embodiment, in which FIG. 10A shows a state before the insulating papers and the phase coils are bundled by wires.

FIG. 10B is a diagram (reproduction) showing the assembly process of the inter-phase insulating paper of the present embodiment, in which FIG. 10B shows a state after the bundle.

DESCRIPTION OF EMBODIMENTS

Hereinafter, an embodiment of the present invention will be described with reference to the accompanying drawings.

[Basic Configuration of Insulating Paper 1 Constituting Inter-Phase Insulating Paper]

Figure 1:
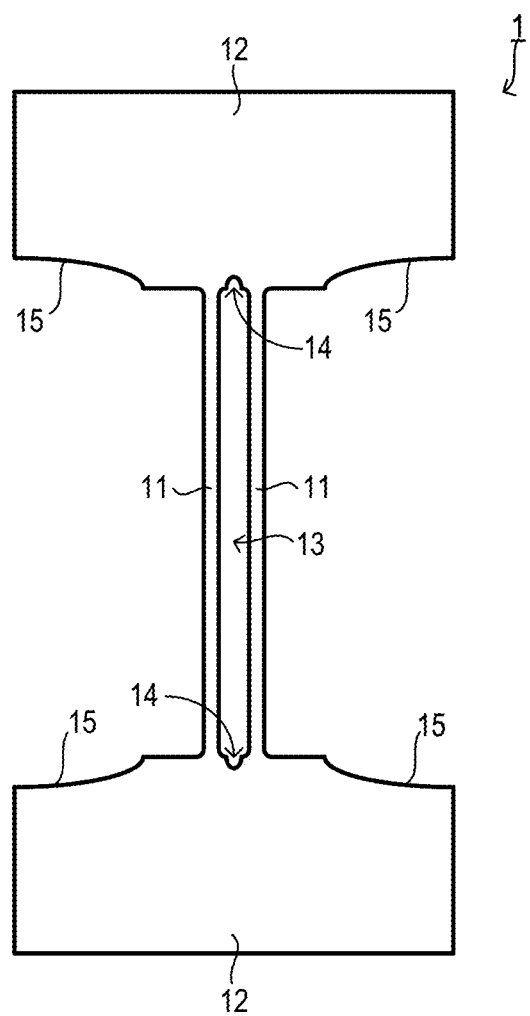
FIG. 1 is a schematic diagram of one of insulating papers constituting an inter-phase insulating paper of the present embodiment.

FIG. 1 is a schematic diagram of one of insulating papers 1 constituting an inter-phase insulating paper of the present embodiment. The inter-phase insulating paper of the present embodiment is constituted by a plurality of insulating papers 1 to be mounted on slots 21 of a stator core 2 of a motor (not shown) in a manner of circulating in a circumferential direction of the stator core 2. The inter-phase insulating paper performs inter-phase insulation between phase coils (U phase coils U, V phase coils V, and W phase coils W) mounted on the stator core 2.

Here, the motor is used for driving a vehicle, for example. In this case, the motor functions as an electric motor that rotates by receiving a supply of electric power from a power source such as a battery and drives wheels of the vehicle. The motor also functions as a generator that is driven by an external force to generate electric power. That is, the motor is configured as a so-called motor generator that functions as an electric motor and a generator. The motor may be used as a drive source of a system other than the vehicle instead of the motor for driving the vehicle.

The insulating paper 1 of the present embodiment has a shape in which two rectangular flat portions 12 are connected by two leg portions 11, and has a planar shape without unevenness before being mounted on the stator core 2. The insulating paper 1 is made of, for example, a three-layer laminate material in which an aramid fiber paper is laminated on both surfaces of a polyethylene terephthalate (PEN) film, and is formed by punching using a dedicated die.

The leg portion 11 is connected to a central portion of an edge of the flat portion 12 in a longitudinal direction of the flat portion 12 (circumferential direction of the stator core 2). The leg portion 11 is a portion having a dimension in a longitudinal direction that is substantially the same as an axial length of the stator core 2 (slot 21), and having a dimension in a width direction that is equal to or less than a circumferential width at a position of an inner wall of an outermost periphery of the slot 21, for example. The leg portion 11 is inserted from a groove of the slot 21.

An elongated hole portion 13 is formed between the leg portions 11. The elongated hole portion 13 is a rectangular opening portion having a width dimension equal to or greater than a circumferential width of a tooth 22 between the slots 21. The tooth 22 is inserted into the elongated hole portion 13 when the leg portion 11 is inserted into the slot 21.

The flat portion 12 is a substantially rectangular member, and protrudes from both ends of the stator core 2 in an axial direction when the leg portion 11 is inserted into the slot 21. The longitudinal direction of the flat portion 12 is perpendicular to the longitudinal direction of the leg portion 11, and when the leg portion 11 is inserted into the slot 21, the flat portion 12 is disposed along the circumferential direction of the stator core 2. The flat portions 12 are arranged to insulate coil ends (portions protruding from the slots 21) of the phase coils from each other.

Each of arc portions 15 is a cutout formed on the edge of the flat portion 12 facing the stator core 2. The arc portion 15 is formed in an arc shape in accordance with a shape of the portion of the phase coil protruding from the slot 21.

A notch 14 (cutout) is disposed on a portion of the flat portion 12 that forms a short side of the elongated hole portion 13. The notch 14 is used for positioning wires 4 to be described later and guiding cutting of the flat portion 12.

Figure 2:
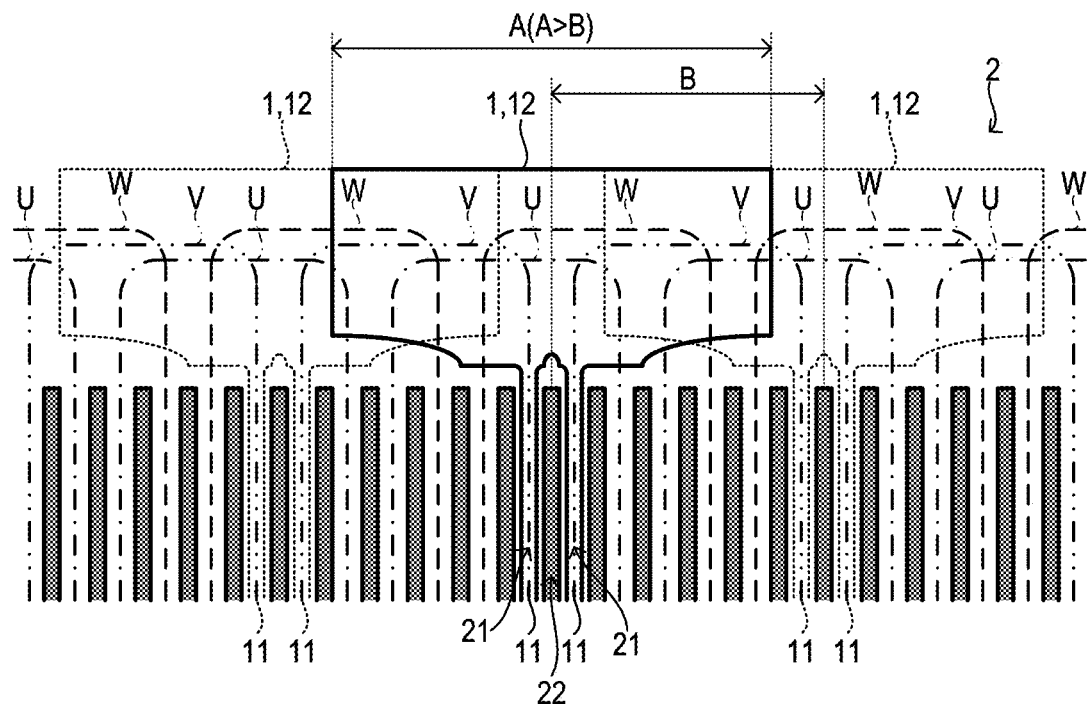
FIG. 2 is a diagram showing a case where the insulating papers of the present embodiment are mounted on a stator core and are expanded in a circumferential direction of the stator core.

FIG. 2 is a diagram showing a case where the insulating papers 1 of the present embodiment are mounted on the stator core 2 and are expanded in the circumferential direction of the stator core 2. Although only one side of the stator core 2 in the axial direction is shown in FIG. 2, an arrangement relationship between the phase coils and the insulating papers 1 is the same on a lead side (side for exchanging a current with the outside) and on a non-lead side.

Figure 7:
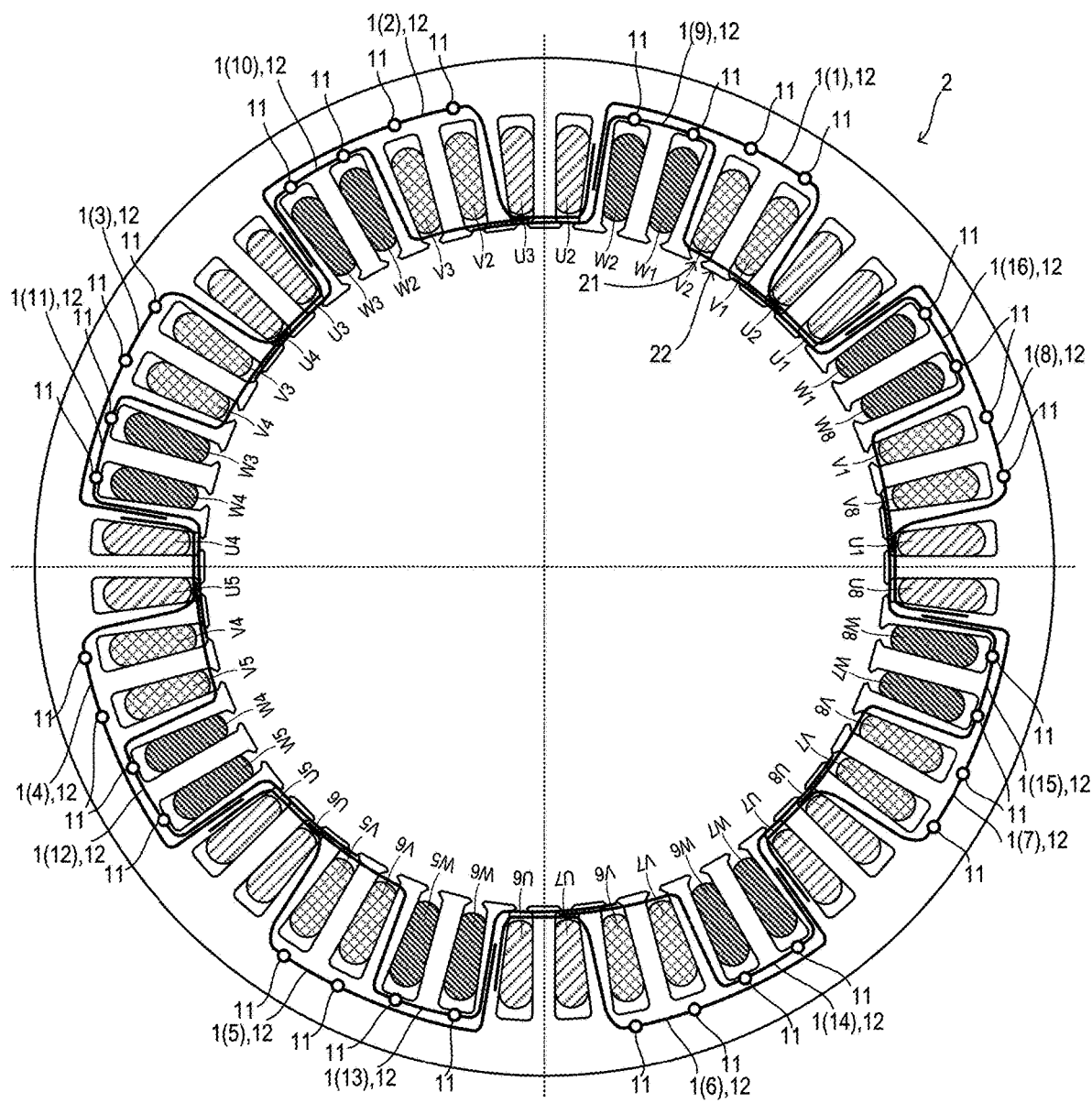
FIG. 7 is a diagram showing the assembly process of the inter-phase insulating paper of the present embodiment, and is a diagram showing a state in which the W phase coils are mounted on the slots into which the leg portions of the insulating papers on the inner peripheral side are inserted.

A plurality of coils having the same phase are mounted on the stator core 2 in a state of being arranged in the circumferential direction (see FIG. 7). Correspondingly, as shown in FIG. 2, the insulating papers 1 are mounted in a state of being arranged in the circumferential direction of the stator core 2 in the same number as the number (eight, see FIG. 7) of coils having the same phase. The insulating papers 1 are arranged such that the flat portions 12 of the insulating papers 1 adjacent to each other in the circumferential direction overlap each other in the circumferential direction.

Accordingly, as shown in FIG. 2, when a circumferential length of the flat portion 12 is A, and a circumferential displacement amount of the insulating papers 1 adjacent to each other, that is, a circumferential interval between a pair of teeth 22 respectively inserted into the elongated hole portions 13 of the insulating papers 1 adjacent to each other is B, a relationship of A>B is established.

As shown in FIG. 2, in the stator core 2, the U phase coil U (first phase coil), the V phase coil V (second phase coil), and the W phase coil W (third phase coil) are arranged in a distributed winding manner. The U phase coil U, the V phase coil V, and the W phase coil W have the same circumferential width, and for example, have a width equivalent to six slots 21 (width spanning five teeth 22).

The V phase coil V is disposed at a position displaced from the U phase coil U by, for example, two slots 21 in one side of the circumferential direction (left side in FIG. 2), and the W phase coil W is disposed at a position displaced from the U phase coil U by, for example, four slots 21 in one side of the circumferential direction (left side in FIG. 2).

As shown in FIG. 2, the insulating paper 1 is disposed such that the tooth 22 sandwiched between a pair of V phase coils V (or other phases) adjacent to each other in the circumferential direction is inserted into the elongated hole portion 13. The insulating paper 1 is disposed such that the tooth 22 sandwiched between a pair of W phase coils W (or other phases) adjacent to each other in the circumferential direction is inserted into the elongated hole portion 13, as will be described later.

As shown in FIGS. 1 and 2, in the insulating paper 1, the leg portion 11 is connected to the central portion of the flat portion 12 in the longitudinal direction, thereby forming a bilaterally symmetrical shape. However, the leg portion 11 may be connected to a position displaced from the central portion of the flat portion 12 in the longitudinal direction to one side in the longitudinal direction, and the insulating paper 1 may be formed in a bilaterally asymmetric shape.

In the insulating paper 1, a pair of leg portions 11 are arranged to sandwich one tooth 22, but may be connected to the flat portion 12 so as to span two or more teeth 22.

Further, the circumferential length of the flat portion 12 of the insulating paper 1 may be set such that when a plurality of insulating papers 1 are mounted in a manner of circulating in the circumferential direction of the stator core 2, the flat portions 12 of a pair of insulating papers 1 adjacent to each other overlap each other in the circumferential direction regardless of the number of phase coils.

[Inter-Phase Insulating Paper of Comparative Example]

Figure 3A:
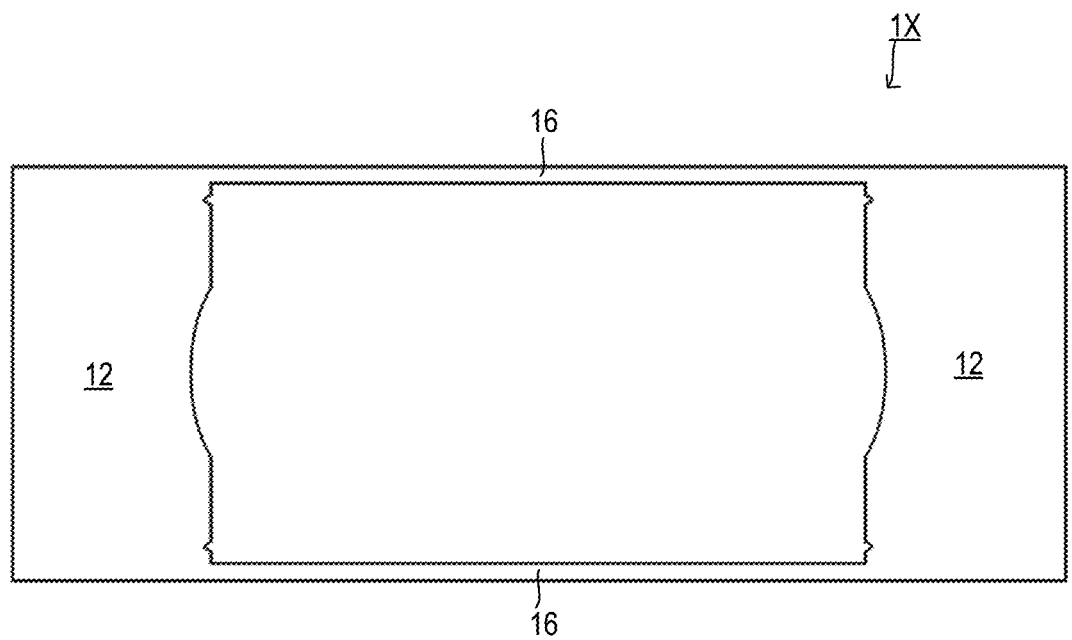
Figure 3B:
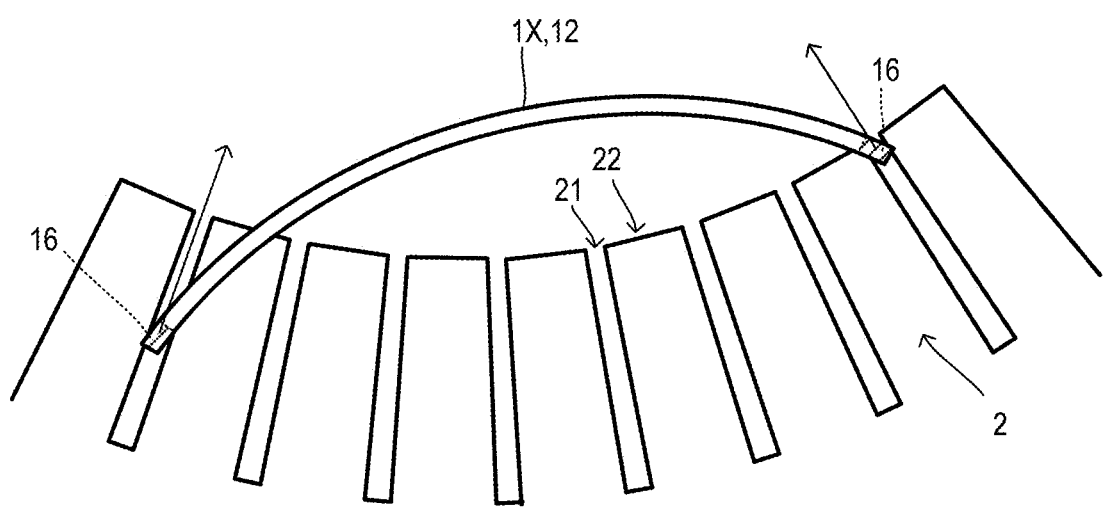
Figure 3C:
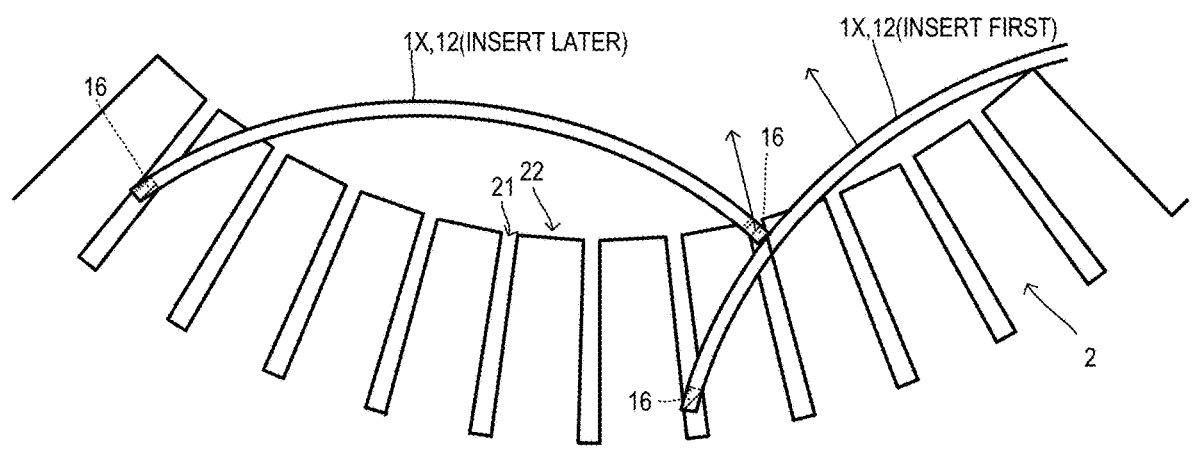
Figure 4:
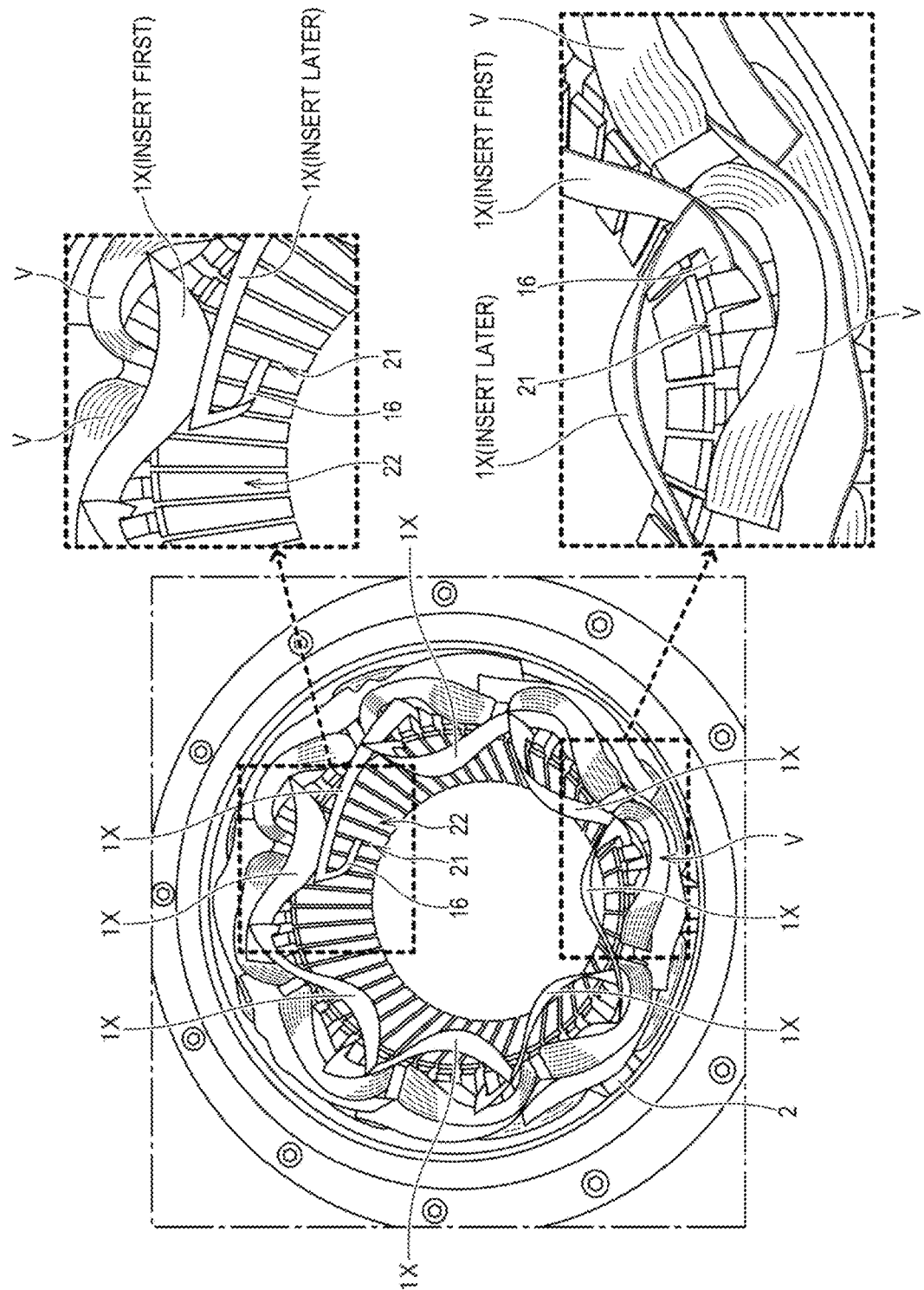
FIG. 4 is a diagram (reproduction) showing a mounting state of the insulating papers of the comparative example.

FIG. 3A is a diagram illustrating insulating papers 1X constituting an inter-phase insulating paper of a comparative example, in which FIG. 3A is a plan view of the insulating paper 1X of the comparative example. FIG. 3B is a diagram illustrating insulating papers 1X constituting an inter-phase insulating paper of a comparative example, in which FIG. 3B is a diagram showing a case where the insulating paper 1X of the comparative example pops out of the slot 21 by itself when the insulating paper 1X is inserted into the stator core 2. FIG. 3C is a diagram illustrating insulating papers 1X constituting an inter-phase insulating paper of a comparative example, in which FIG. 3C is a diagram showing a case where when the insulating papers 1X of the comparative example are inserted into the stator core 2, the insulating paper 1X inserted later pops out of the slot 21 due to a force from the insulating paper 1X inserted first. FIG. 4 is a diagram (reproduction) showing a mounting state of the insulating papers 1X of the comparative example.

In FIG. 3B and FIG. 3C, an illustration of each phase coil is omitted. FIG. 4 shows a case where the insulating papers 1X of the comparative example are mounted after the V phase coils V are mounted.

As shown in FIG. 3A, a plurality of insulating papers 1X of the comparative example are mounted on the slots 21 in a manner of circulating in the circumferential direction of the stator core 2 similarly to the insulating papers 1 of the present embodiment, thereby forming the inter-phase insulating paper. The insulating paper 1X includes flat portions 12 and leg portions 16, but the leg portions 16 are arranged at both ends of each flat portion 12 in a longitudinal direction (circumferential direction).

The insulating paper 1X of the comparative example is similar to the insulating paper disclosed in JP 2007-60819 A described above. Similarly to the insulating papers 1 of the present embodiment, a plurality of (eight) insulating papers 1X of the comparative example are mounted on the stator core 2 in a state of being arranged in the circumferential direction of the stator core 2 (see FIG. 4), and the insulating papers 1X adjacent to each other are mounted in a manner of overlapping each other in the circumferential direction by one slot 21(see FIG. 3C).

As a procedure of mounting the phase coils and the insulating papers 1X on the stator core 2, for example, a plurality of U phase coils U (which may be starting from other phase coils) are mounted on the stator core 2 in a manner of circulating in the circumferential direction, and a plurality of insulating papers 1X are mounted on the stator core 2 in a manner of circulating in the circumferential direction. Next, after the U phase coils U (coil ends) and the flat portions 12 of the insulating papers 1X are bent to an outer peripheral side of the stator core 2, a plurality of V phase coils V are mounted on the stator core 2 in a manner of circulating in the circumferential direction, and a plurality of insulating papers 1X are mounted on the stator core 2 in a manner of circulating in the circumferential direction. Then, after the V phase coils V (coil ends) and the flat portions 12 of the insulating papers 1X mounted later are bent to the outer peripheral side of the stator core 2, a plurality of W phase coils W are mounted on the stator core 2 in a manner of circulating in the circumferential direction (see FIGS. 5 to 7).

The insulating paper 1X of the comparative example is flat in an initial state, but the coil end after molding has an intricate shape, and thus when the insulating paper 1X is mounted on the slot 21, the entire insulating paper 1X interfering with the coil end cannot stay in the circumferential direction of the stator core 2 and may move to an inner diameter side of the stator core 2 (see FIG. 3B and FIG. 4). As a result, the leg portion 16 of the insulating paper 1X pops out of the groove of the slot 21 of the stator core 2, causing a problem that a next phase coil cannot be inserted (see an upper enlarged view of FIG. 4).

The insulating paper 1X of the comparative example is deformed into an arc shape or an S shape when being inserted into the stator core 2, and thus the leg portion 16 of the insulating paper 1X is twisted, and the leg portion 16 may be directed in a direction in which the leg portion 16 easily pops out of the groove of the slot 21. At this time, the insulating paper 1X inserted later is pushed by the insulating paper 1X inserted first, and thus there is a problem that the leg portion 16 may pop out of the groove of the slot 21 (see FIG. 3C and a lower enlarged view of FIG. 4).

Due to the above reason, there is a problem that the insulating paper 1X once mounted pops out to the inner diameter side of the stator core 2 before a coil is inserted in a next process, and the insulating paper 1X is detached from between the coils or a positional displacement of the insulating paper 1X occurs.

As described above, in order to prevent the insulating paper 1X from popping out to the inner diameter side, it is necessary to hold the insulating paper 1X with a jig or a tape, which causes a problem of requiring additional jig costs and work man-hours.

When the insulating papers 1X are assembled to the stator core 2, the insulating papers 1X are inserted between a first phase coil (U phase coil U) and a second phase coil (V phase coil V) and between the second phase coil (V phase coil V) and a third phase coil (W phase coil W), and are deformed into a three-dimensional shape at respective insertion positions.

Accordingly, in order to reduce the pop-out of the insulating paper 1X to the inner diameter side, it is also conceivable to provide a fold in the insulating paper 1X in advance corresponding to an insertion position of the stator core 2 to form a three-dimensional shape. However, a three-dimensional shape of the insulating paper 1X between the first phase coil (U phase coil U) and the second phase coil (V phase coil V) and a three-dimensional shape of the insulating paper 1X between the second phase coil (V phase coil V) and the third phase coil (W phase coil W) are different from each other, and thus it is necessary to form at least two types of three-dimensional shapes in advance. Accordingly, an assembly process is complicated, and a jig or the like for forming a three-dimensional shape is required, which increases the costs.

However, in the present embodiment, as described below, it is possible to prevent pop-out of the leg portion 11 and a positional displacement of the insulating paper 1 without requiring a jig or the like, and it is possible to mount the insulating paper 1 on the slot 21 of the stator core 2 without forming a three-dimensional shape in advance.

[Assembly Process of Insulating Papers 1]

Figure 5A:
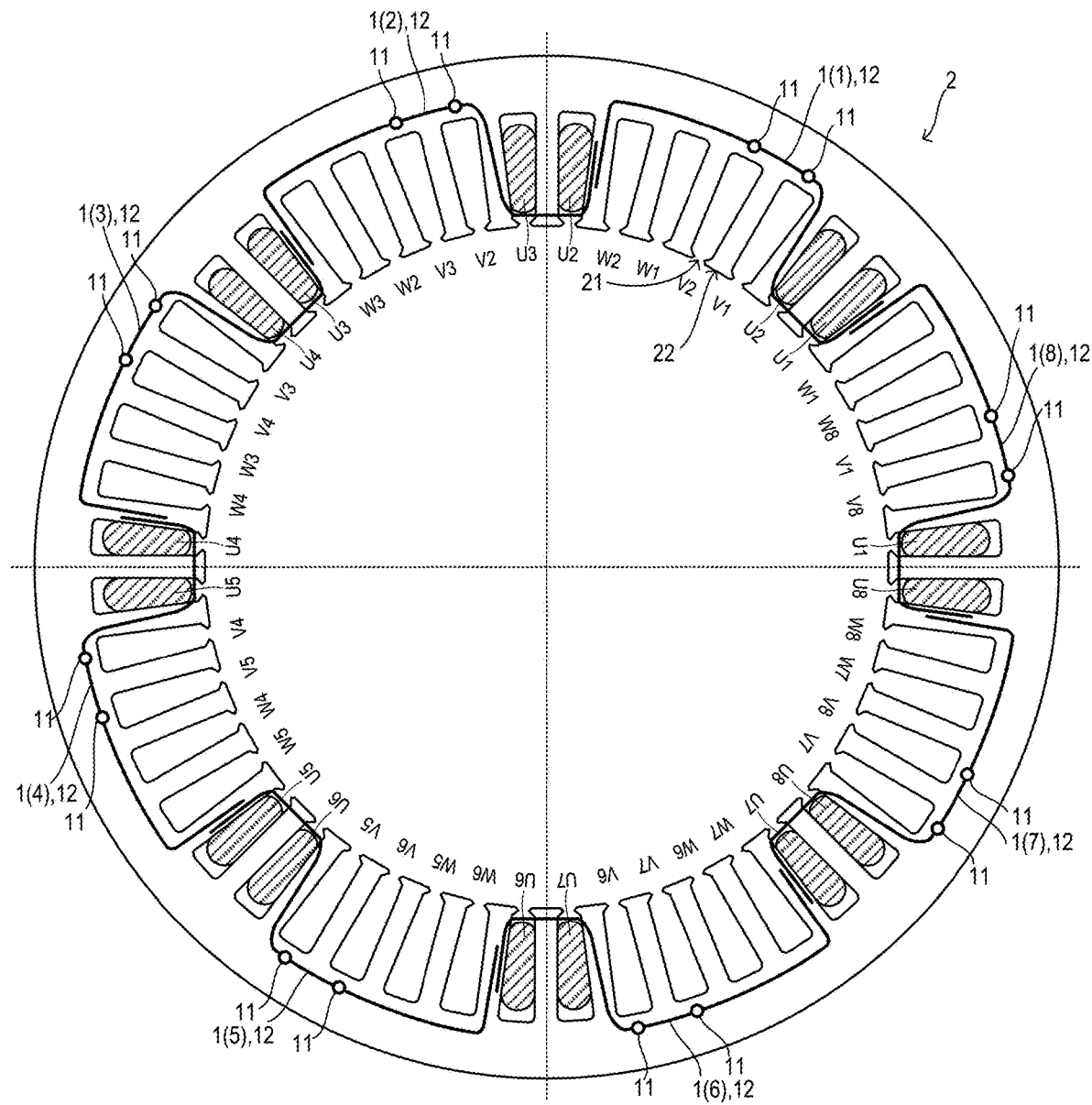
Figure 5B:
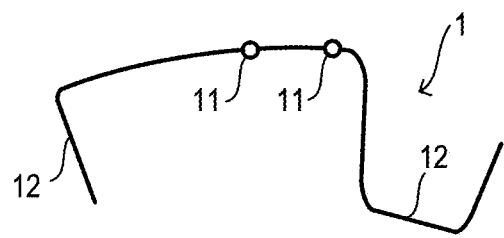
Figure 6A:
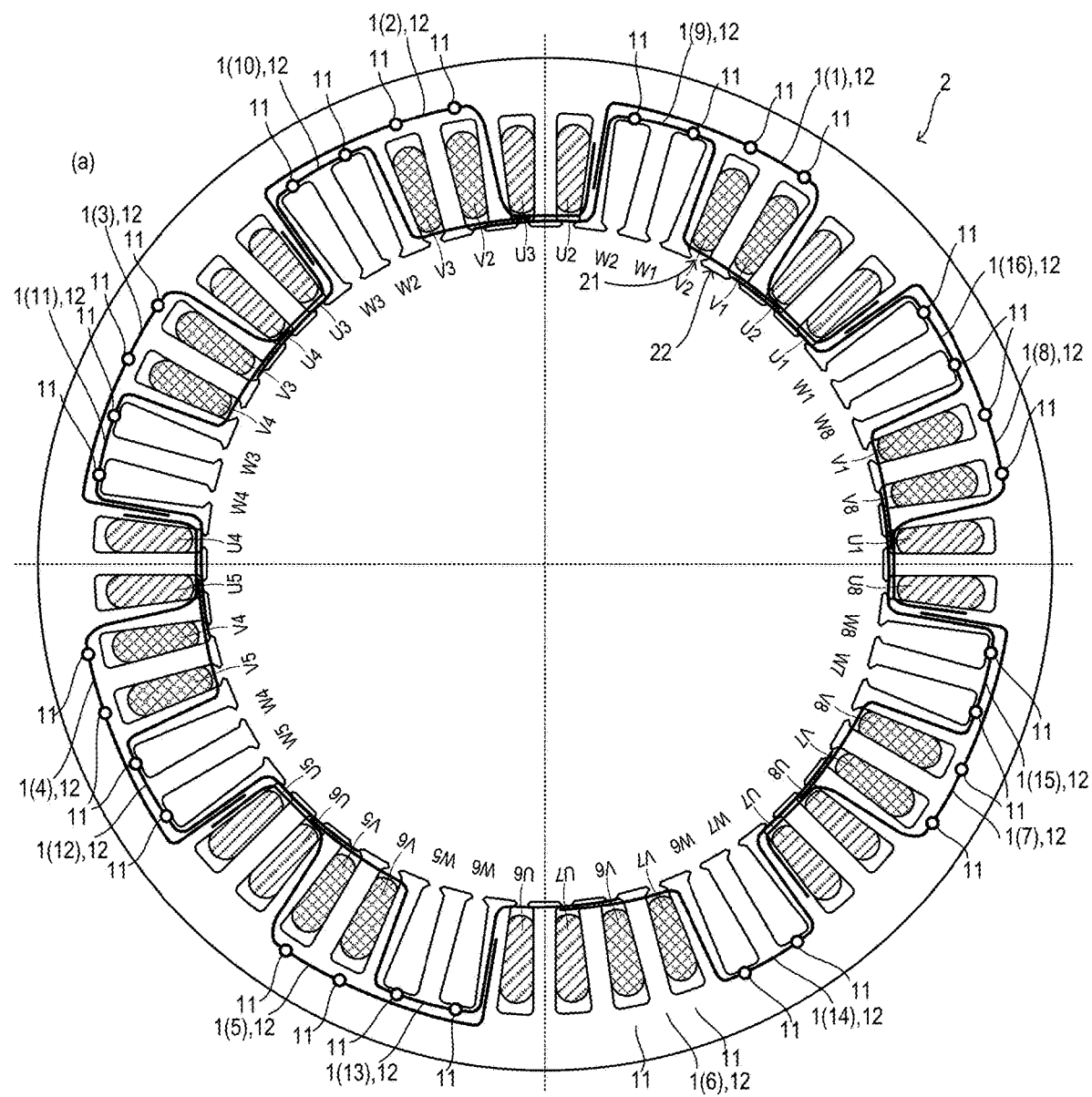
Figure 6B:
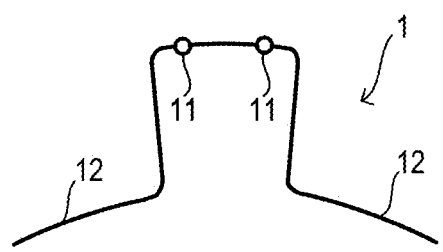

FIG. 5A is a diagram showing an assembly process of the inter-phase insulating paper of the present embodiment, in which FIG. 5A is a diagram showing a state in which the U phase coils U and the insulating papers 1 on the outer peripheral side are mounted. FIG. 5B is a diagram showing an assembly process of the inter-phase insulating paper of the present embodiment, in which FIG. 5B is a diagram of the flat portion 12 of the insulating paper 1 on the outer peripheral side viewed from the axial direction. FIG. 6A is a diagram showing the assembly process of the inter-phase insulating paper of the present embodiment, in which FIG. 6A is a diagram showing a state in which the V phase coils V are mounted on the slots 21 into which the leg portions 11 of the insulating papers 1 on the outer peripheral side are inserted, and the leg portions 11 of the insulating papers 1 on an inner peripheral side are inserted into the slots 21 on which the W phase coils W are to be mounted. FIG. 6B is a diagram showing the assembly process of the inter-phase insulating paper of the present embodiment, in which FIG. 6B is a diagram of the flat portion 12 of the insulating paper 1 on the inner peripheral side viewed from the axial direction. FIG. 7 is a diagram showing the assembly process of the inter-phase insulating paper of the present embodiment, and is a diagram showing a state in which the W phase coils W are mounted on the slots 21 into which the leg portions 11 of the insulating papers 1 on the inner peripheral side are inserted. In FIGS. 5 to 7, illustrations of the coil ends of the phase coils are omitted.

The stator core 2 to which the insulating papers 1 of the present embodiment are applied has 48 slots 21 and 48 teeth 22 as shown in FIG. 5. Eight U phase coils U (U1 to U8), eight V phase coils V (V1 to V8), and eight W phase coils W (W1 to W8) are prepared and mounted on the slots 21.

As shown in FIG. 5A, the U phase coils U (U1 to U8) are mounted on the slots 21, and leg portions 11 of insulating papers 1((1) to (8)) (first inter-phase insulating paper) are inserted into the slots 21 on which the V phase coils V are to be mounted.

At this time, the leg portions 11 of the insulating paper 1(1) are inserted into a slot 21(V1) and a slot 21(V2), respectively. Here, for ease of illustration, the leg portions 11 are illustrated at positions away from the slot 21(V1) and the slot 21(V2), and the same applies below.

Similarly, the leg portions 11 of the insulating paper 1(2) are respectively inserted into the slot 21(V2) and a slot 21(V3), the leg portions 11 of the insulating paper 1(3) are respectively inserted into the slot 21(V3) and a slot 21(V4), and the leg portions 11 of the insulating paper 1(4) are respectively inserted into the slot 21(V4) and a slot 21(V5).

Similarly, the leg portions 11 of the insulating paper 1(5) are respectively inserted into the slot 21(V5) and a slot 21(V6), the leg portions 11 of the insulating paper 1(6) are respectively inserted into the slot 21(V6) and a slot 21(V7), the leg portions 11 of the insulating paper 1(7) are respectively inserted into the slot 21(V7) and a slot 21(V8), and the leg portions 11 of the insulating paper 1(8) are respectively inserted into the slot 21(V8) and the slot 21(V1).

At this time, the leg portions 11 of the insulating papers 1((1) to (8)) are arranged on an inner wall side of the outermost periphery of the slot 21, and a portion of each flat portion 12 overlapping the U phase coil U in the circumferential direction is bent to an inner peripheral side of the stator core 2, and further bent so as to cover an inner peripheral side of a coil end of the U phase coil U on one side (right side of the flat portion 12 in FIG. 5B) of the flat portion 12 in the circumferential direction, thereby deforming the insulating paper 1 into a three-dimensional shape shown in FIG. 5B.

Figure 9A:
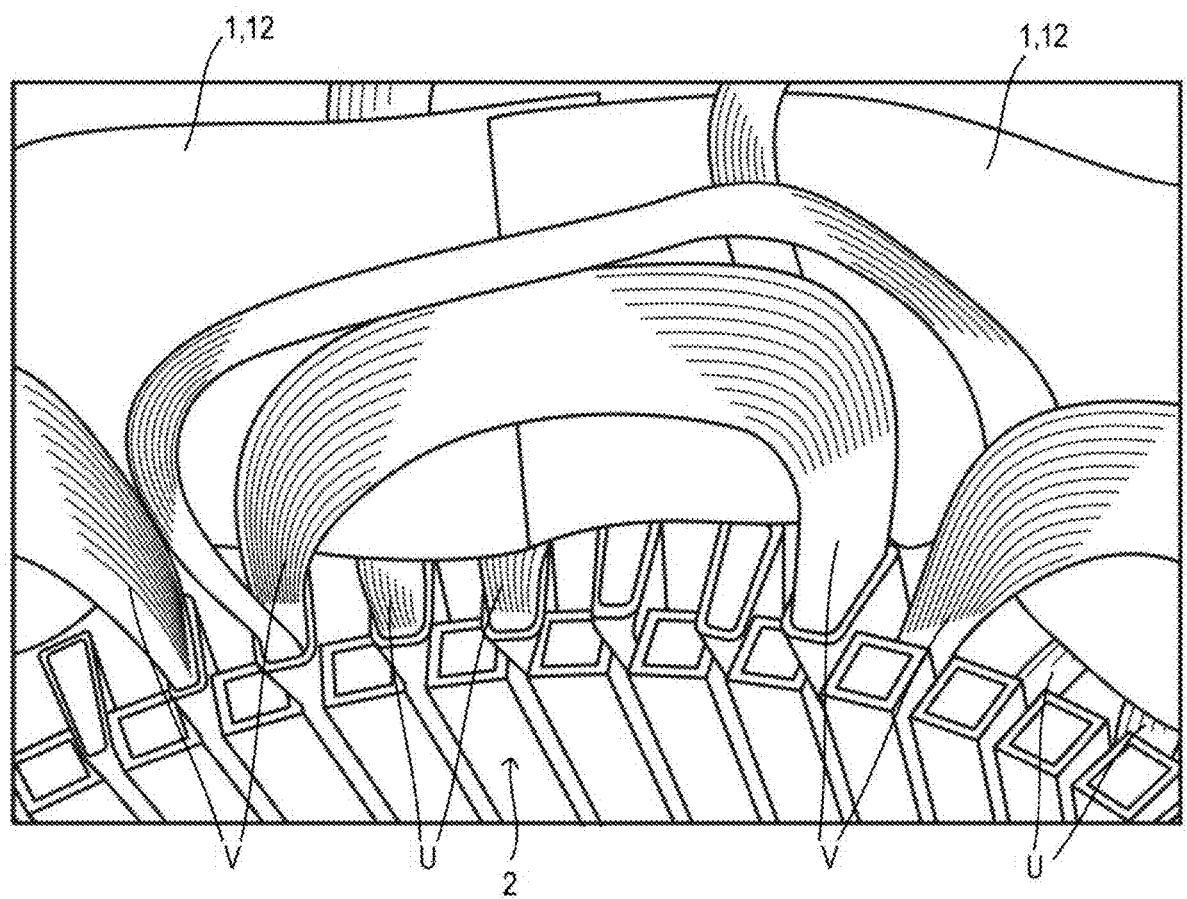
Figure 9B:
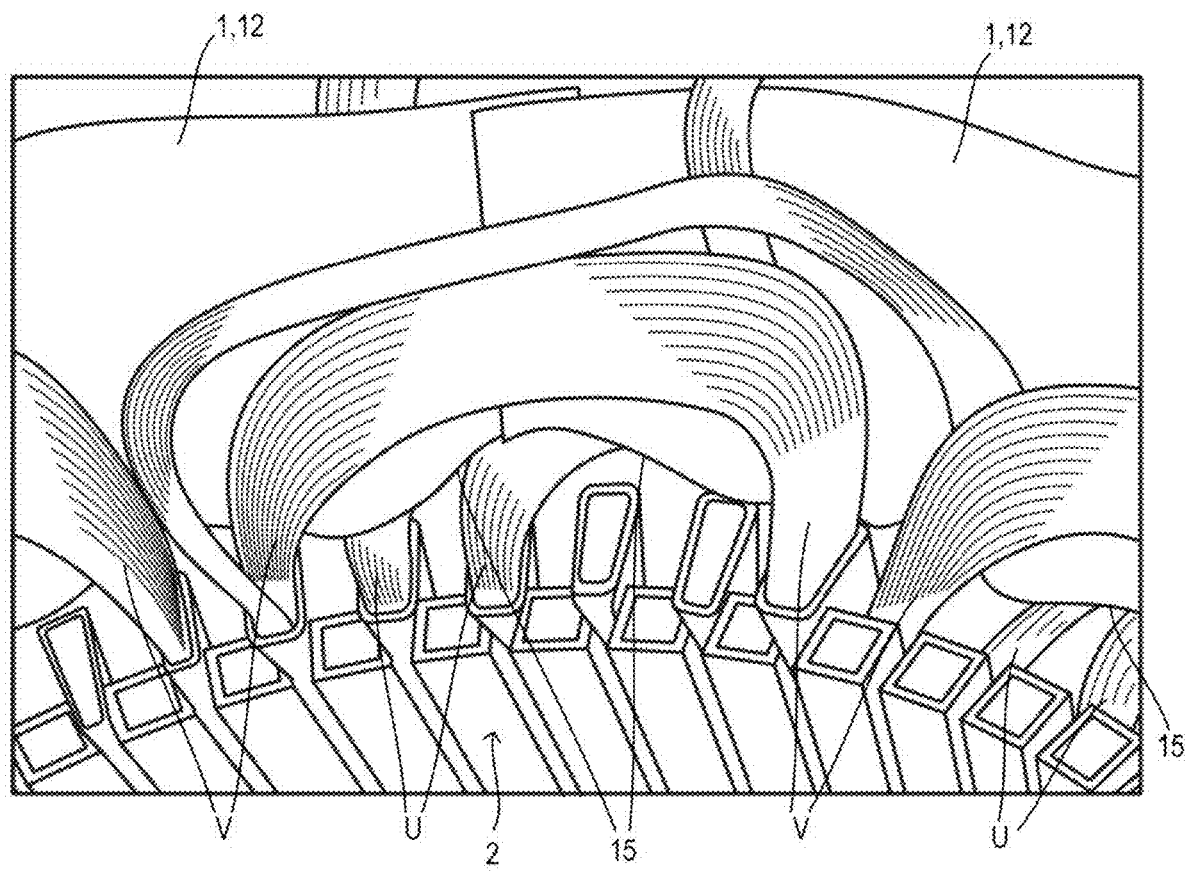

Then, in order to mount the next V phase coils V, the coil ends of the U phase coils U and the flat portions 12 of the insulating papers 1((1) to (8)) are bent to the outer peripheral side of the stator core 2 (see FIG. 9A and FIG. 9B).

As shown in FIG. 6A, the V phase coils V (V1 to V8) are mounted on the slots 21, and leg portions 11 of insulating papers 1((9) to (16)) (second inter-phase insulating paper) are inserted into the slots 21 on which the W phase coils W are to be mounted.

At this time, the leg portions 11 of the insulating paper 1(9) are respectively inserted into a slot 21(W1) and a slot 21(W2), the leg portions 11 of the insulating paper 1(10) are respectively inserted into the slot 21(W2) and a slot 21(W3), the leg portions 11 of the insulating paper 1(11) are respectively inserted into the slot 21(W3) and a slot 21(W4), and the leg portions 11 of the insulating paper 1(12) are respectively inserted into the slot 21(W4) and a slot 21(W5).

Similarly, the leg portions 11 of the insulating paper 1(13) are respectively inserted into the slot 21(W5) and a slot 21(W6), the leg portions 11 of the insulating paper 1(14) are respectively inserted into the slot 21(W6) and a slot 21(W7), the leg portions 11 of the insulating paper 1(15) are respectively inserted into the slot 21(W7) and a slot 21(W8), and the leg portions 11 of the insulating paper 1(16) are respectively inserted into the slot 21(W8) and the slot 21(W1).

At this time, the leg portions 11 of the insulating papers 1((9) to (16)) are arranged on the inner wall side of the outermost periphery of the slot 21, and a portion of each flat portion 12 overlapping the U phase coil U and the V phase coil V in the circumferential direction is bent to the inner peripheral side of the stator core 2, and further bent so as to cover the inner peripheral side of the coil end of the U phase coil U and an inner peripheral side of a coil end of the V phase coil V, thereby deforming the insulating paper 1 into a three-dimensional shape shown in FIG. 6B.

Then, in order to mount the next W phase coils W, the coil ends of the V phase coils V and the flat portions 12 of the insulating papers 1((9) to (16)) are bent to the outer peripheral side of the stator core 2 (see FIG. 9A and FIG. 9B). Then, as shown in FIG. 7, by mounting the W phase coils W (W1 to W8) on the slots 21, the assembly process of the phase coils and the insulating papers 1 to the stator core 2 is completed.

Thereafter, the coil ends of the U phase coils U are bundled by the insulating wires 4 (see FIG. 10A and FIG. 10B), the coil ends of the V phase coils V and the insulating papers 1((1) to (8)) on the outer peripheral side are bundled by the wires 4, coil ends of the W phase coils W and the insulating papers 1((9) to (16)) on the inner peripheral side are bundled by the wires 4, and then varnish (not shown) is applied to each phase coil.

[States of Insulating Papers 1 During Assembly Process]

Figure 8:
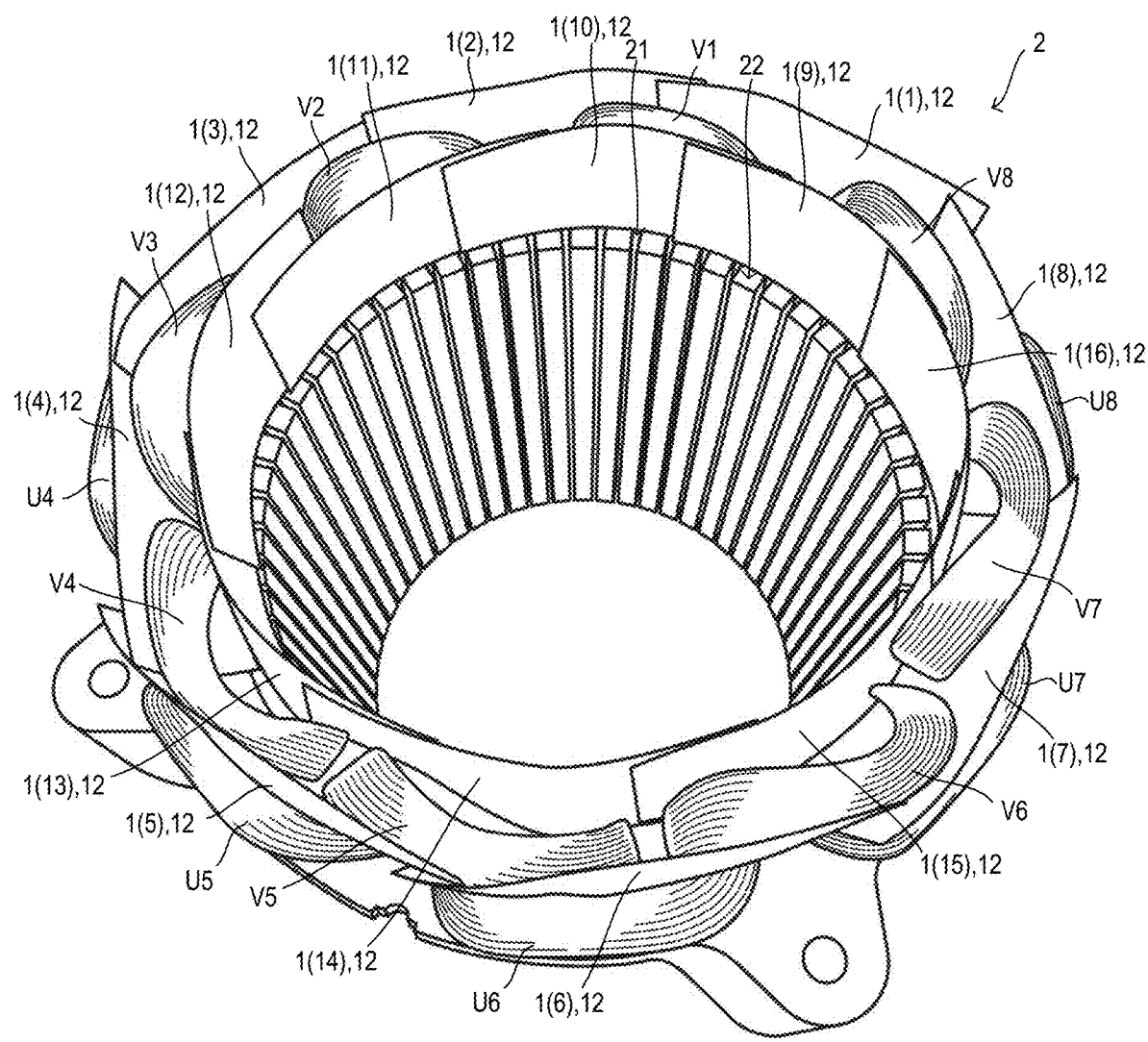
FIG. 8 is a diagram (reproduction) showing the assembly process of the inter-phase insulating paper of the present embodiment, and shows a state after the insulating papers on the inner peripheral side are inserted into the slots.

FIG. 8 is a diagram (reproduction) showing the assembly process of the inter-phase insulating paper of the present embodiment, and shows a state after the insulating papers 1 on the inner peripheral side are inserted into the slots 21. In FIG. 8, the flat portions 12 of the insulating papers 1((1) to (8)) on the outer peripheral side are bent to the outer peripheral side together with the V phase coils V.

As shown in FIG. 1, in the insulating paper 1, the flat portion 12 is connected to the leg portions 11 at the central portion in the circumferential direction, and thus a movement of the central portion of the flat portion 12 in the circumferential direction is restricted by the leg portions 11, but the other portions can be freely deformed. Accordingly, as shown in FIG. 8, the flat portion 12 of the insulating paper 1 can be deformed without being damaged. As described above, when the circumferential length of the flat portion 12 is A and the circumferential interval between the pair of teeth 22 respectively inserted into the elongated hole portions 13 of the insulating papers 1 adjacent to each other is B, the relationship A>B is established.

Accordingly, as shown in FIG. 8, even if the flat portions 12 of the insulating papers 1((1) to (8)) (see FIG. 7) arranged on the outer peripheral side are bent to the outer peripheral side of the stator core 2 together with the U phase coils U, the flat portions 12 of the insulating papers 1 adjacent to each other in the circumferential direction can maintain a state of overlapping each other in the circumferential direction, and the insulation between the U phase coils U and the V phase coils V can be maintained.

Similarly, even if the flat portions 12 of the insulating papers 1((9) to (16)) (see FIG. 7) arranged on the inner peripheral side are bent to the outer peripheral side of the stator core 2 together with the V phase coils V, the flat portions 12 of the insulating papers 1 adjacent to each other in the circumferential direction can maintain a state of overlapping each other in the circumferential direction, and the insulation between the V phase coils V and the W phase coils W can be maintained.

As shown in FIG. 8, it can be seen that the leg portions 11 of the insulating papers 1((9) to (16)) (FIG. 7) arranged on the inner peripheral side do not protrude from the grooves of the slots 21. The same applies to the insulating papers 1((1) to (8)) (FIG. 7) arranged on the outer peripheral side.

In the insulating paper 1 of the present embodiment, a central portion of the insulating paper 1 in the circumferential direction (the central portion of the flat portion 12 in the circumferential direction and the leg portions 11) are hardly deformed before and after the mounting on the slot 21, and the pair of leg portions 11 can be reliably inserted into a pair of slots 21 adjacent to each other, respectively. Accordingly, a restoring force that may be generated due to the deformation of the flat portion 12 and the leg portion 11 can be reduced. Therefore, the insulating paper 1 does not rotate when being mounted on the stator core 2, and is in a semi-fixed state with respect to the stator core 2 by mounting the leg portions 11 on the slots 21 alone.

Also, when the flat portion 12 is deformed as shown in FIG. 5B and FIG. 6B, the central portion of the insulating paper 1 in the circumferential direction (the central portion of the flat portion 12 in the circumferential direction and the leg portions 11) is hardly deformed or displaced. Specifically, the leg portion 11 is not deformed such that the width direction of the leg portion 11 faces the groove of the slot 21, and the central portion of the flat portion 12 in the circumferential direction is hardly deformed to the inner peripheral side of the stator core 2, and thus the leg portion 11 is hardly displaced to a groove side of the slot 21. Therefore, the protrusion of the leg portion 11 from the groove of the slot 21 can be reduced.

FIG. 9A is a diagram (reproduction) showing the assembly process of the inter-phase insulating paper of the present embodiment, and shows a state in which the insulating papers 1 on the outer peripheral side and the V phase coils V are bent to the outer peripheral side of the stator core 2 after the V phase coils V are mounted on the slots 21, in which FIG. 9A shows a case where the flat portion 12 does not have the arc portion 15. FIG. 9B is a diagram (reproduction) showing the assembly process of the inter-phase insulating paper of the present embodiment, and shows a state in which the insulating papers 1 on the outer peripheral side and the V phase coils V are bent to the outer peripheral side of the stator core 2 after the V phase coils V are mounted on the slots 21, in which FIG. 9B shows a case where the flat portion 12 has the arc portions 15.

As described above, after the assembly process of the phase coils and the insulating papers 1 to the stator core 2, the coil ends of the phase coils are bundled by the wires 4 (see FIG. 10A and FIG. 10B), and then the varnish is applied to each phase coil, but the wires 4 are omitted in FIG. 9A and FIG. 9B.

When the insulating paper 1 of the present embodiment does not have the arc portion 15 shown in FIG. 1 and the flat portion 12 is rectangular, as shown in FIG. 9A, both ends of the insulating paper 1 in the circumferential direction cover the coil end of the U phase coil U more than necessary, and thus the applying of the varnish to the U phase coil U may be complicated.

However, when the insulating papers 1 (insulating papers 1(1) to 1(8) (FIG. 8)) having the arc portions 15 are mounted on the stator core 2, as shown in FIG. 9B, an area in which the flat portion 12 covers the coil end of the U phase coil U can be reduced, and thus interference caused by the flat portion 12 when the varnish is applied can be reduced, and the varnish can be applied efficiently.

Similarly, when the insulating papers 1((9) to (16)) (FIG. 7) having the arc portions 15 are mounted, an area in which the flat portion 12 covers the coil end of the V phase coil V can be reduced, and thus the interference caused by the flat portion 12 when the varnish is applied can be reduced, and the varnish can be applied efficiently.

Figure 10A:
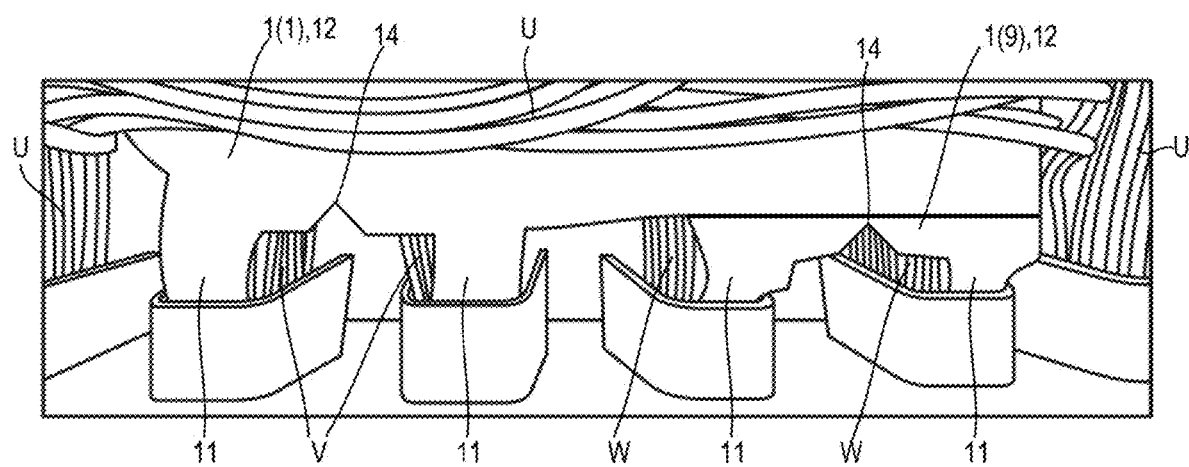
Figure 10B:
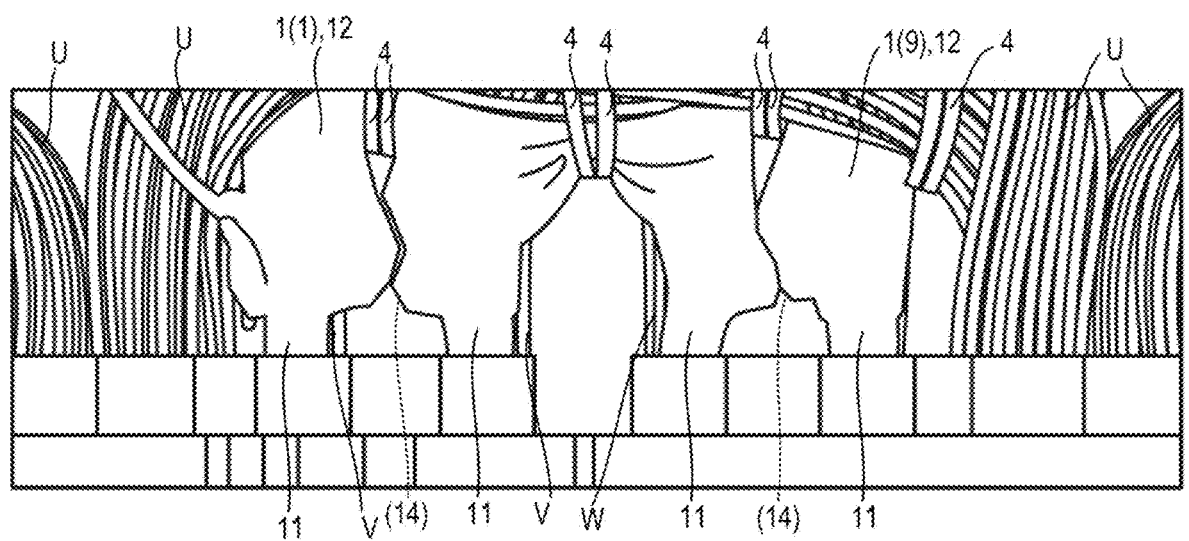

FIG. 10A is a diagram (reproduction) showing the assembly process of the inter-phase insulating paper of the present embodiment, in which FIG. 10A shows a state before the insulating papers 1 and the phase coils are bundled by the wires 4. FIG. 10B is a diagram (reproduction) showing the assembly process of the inter-phase insulating paper of the present embodiment, in which FIG. 10B shows a state after the bundle. FIG. 10A and FIG. 10B show a case where the U phase coils U and the insulating papers 1 are bundled.

As shown in FIG. 10A, the notch 14 (cutout) is disposed in the flat portion 12 of each of the insulating papers 1 (insulating paper 1(1) and insulating paper 1(9) in FIG. 10A and FIG. 10B) and at a position corresponding to the short side of the elongated hole portion 13 (FIG. 1). When the phase coils and the insulating papers 1 are bundled by the wires 4, the wires 4 are fastened to the notches 14.

Accordingly, as shown in FIG. 10B, when the phase coils (U phase coils U in FIG. 10A and FIG. 10B) and the insulating papers 1 are bundled by the wires 4, a portion of each wire 4 fastened to the notch 14 moves linearly (upward direction in FIG. 10B) toward the coil end of the corresponding phase coil, but in the flat portion 12, a cut preferentially occurs along a direction in which the wire 4 moves with the notch 14 as a starting point, and the cut is formed in a manner of extending to a coil end side in accordance with a trajectory in which the wire 4 moves.

Even in this state, the flat portion 12 is not divided in the circumferential direction, and thus the insulation between the phase coils by using the flat portion 12 is maintained.

Therefore, when the phase coils and the insulating papers 1 are tied by the wires 4, for example, the leg portion 11 is prevented from being cut, and the cut can be formed in the insulating paper 1 in an intended direction.

Effects of Present Embodiment

The inter-phase insulating paper of the present embodiment is an inter-phase insulating paper that includes a plurality of insulating papers 1 arranged in a stator core 2 in a manner of circulating in a circumferential direction and configured to perform inter-phase insulation of each phase coil provided in the stator core 2, in which the insulating paper 1 includes a pair of leg portions 11 to be respectively inserted into a pair of slots 21 among a plurality of slots 21 formed in the stator core 2, and a pair of flat portions 12 connected to the pair of leg portions 11 and protruding from both end surfaces of the stator core 2 in an axial direction to perform the inter-phase insulation of each phase coil, and the pair of leg portions 11 are connected to a central portion of an edge of the flat portion 12.

According to the above configuration, a central portion of the insulating paper 1 in the circumferential direction (the central portion of the flat portion 12 in the circumferential direction and the leg portions 11) are hardly deformed before and after mounting of the insulating paper 1 on the slot 21, and the pair of leg portions 11 can be reliably inserted into a pair of the slots 21 adjacent to each other, respectively. Accordingly, a restoring force that may be generated due to the deformation of the flat portion 12 and the leg portion 11 can be reduced.

Also, when the flat portion 12 is deformed in accordance with a shape of a coil end of the phase coil, the central portion of the insulating paper 1 in the circumferential direction (the central portion of the flat portion 12 in the circumferential direction and the leg portions 11) is hardly deformed or displaced. Specifically, the leg portion 11 is not deformed such that a width direction of the leg portion 11 faces a groove of the slot 21, and the central portion of the flat portion 12 in the circumferential direction is hardly deformed to an inner peripheral side of the stator core 2, and thus the leg portion 11 is hardly displaced to a groove side of the slot 21. Therefore, protrusion of the leg portion 11 from the groove of the slot 21 can be reduced, and the insulating paper 1 can be easily mounted on the slot 21 of the stator core 2.

In the present embodiment, when a circumferential length of the flat portion 12 is A and a circumferential displacement amount of a pair of the insulating papers 1 adjacent to each other when the insulating papers 1 are mounted on the stator core 2 is B, the flat portions 12 of the pair of the insulating papers 1 adjacent to each other overlap each other by satisfying a relationship of A>B. Accordingly, the inter-phase insulation of the phase coil (coil end) can be reliably performed.

In the present embodiment, the insulating paper 1 has a planar shape before being mounted on the stator core 2. Accordingly, the insulating paper 1 can be easily managed.

In the present embodiment, an elongated hole (elongated hole portion 13) is formed between the pair of leg portions 11 in accordance with an outer shape of a tooth 22 between a pair of the slots 21, and the tooth 22 is to be inserted into the elongated hole (elongated hole portion 13). Accordingly, the leg portion 11 can be inserted into the slot 21 stably.

In the present embodiment, a cutout (notch 14) is provided in the flat portion 12 and at a position corresponding to a short side of the elongated hole (elongated hole portion 13). Accordingly, when the insulating papers 1 and the phase coils (coil ends) are bundled by wires 4, a cut can be formed in an intended direction with respect to the flat portion 12.

In the present embodiment, the edge of the flat portion 12 facing the stator core 2 when the leg portion 11 is inserted into the slot 21 has an arc shape (arc portion 15) that extends in a direction orthogonal to a longitudinal direction of the leg portion 11 from a position of the edge corresponding to a base of the leg portion 11, that is separated from the stator core 2 from an intermediate position to an end of the flat portion 12, and that is convex in a direction separated from the stator core 2. Accordingly, when varnish is applied to the phase coil after the insulating paper 1 and the phase coil are assembled to the stator core 2, an area in which the flat portion 12 excessively covers the phase coil can be reduced, and thus interference caused by the flat portion 12 when the varnish is applied can be reduced, and the varnish can be applied efficiently.

A motor of the present embodiment is formed by assembling the insulating paper 1 to the stator core 2 together with the phase coil. Accordingly, in the motor, the inter-phase insulation of the phase coil is easily and reliably performed.

In the present embodiment, the number of the insulating papers 1 to be mounted on the stator core 2 in a manner of circulating in a circumferential direction is set to be the same as the number of a plurality of coils having the same phase mounted on the stator core 2 in a state of being arranged in a manner of circulating in the circumferential direction.

Accordingly, the inter-phase insulation of the phase coil (coil end) can be reliably performed. Further, the number of the insulating papers 1 can be reduced, and the phase coil can be mounted on the slot 21 to close the groove of the slot 21 in a process subsequent to a process of inserting the leg portion 11 into the slot 21 when the insulating paper 1 and the phase coil are assembled to the stator core 2. Accordingly, it is possible to shorten a time from when the leg portion 11 is inserted into the slot 21 to when the groove of the slot 21 is closed, thereby reducing the protrusion of the leg portion 11 from the groove of the slot 21.

In the present embodiment, in a case where a plurality of first phase coils (U phase coils U), second phase coils (V phase coils V), and third phase coils (W phase coils W) which have different phases from each other are mounted on the stator core 2 in a state of being arranged in the circumferential direction, the insulating paper 1 includes a first insulating paper (insulating papers 1((1) to (8)) in which the leg portions 11 are respectively inserted into a pair of the slots 21 on which a pair of the second phase coils (V phase coils V) adjacent to each other in the circumferential direction are to be mounted respectively, one side of the flat portion 12 in the circumferential direction is sandwiched between the first phase coil (U phase coil U) and the second phase coil (V phase coil V), and the other side of the flat portion 12 in the circumferential direction is sandwiched between the third phase coil (W phase coil W) and the first phase coil (U phase coil U), and a second insulating paper (insulating papers 1((9) to (16)) disposed on an inner peripheral side of the stator core 2 with respect to the first insulating paper (insulating papers 1((1) to (8)), in which the leg portions 11 are respectively inserted into a pair of the slots 21 on which a pair of the third phase coils (W phase coils W) adjacent to each other in the circumferential direction are to be mounted respectively, one side of the flat portion 12 in the circumferential direction is sandwiched between the second phase coil (V phase coil V) and the third phase coil (W phase coil W), and the other side of the flat portion 12 in the circumferential direction is sandwiched between the third phase coil (W phase coil W) and the first phase coil (U phase coil U), a plurality of the first insulating papers (insulating papers 1((1) to (8)) are arranged in a manner of circulating in the circumferential direction, and the first insulating papers (insulating papers 1((1) to (8)) adjacent to each other in the circumferential direction overlap each other in the circumferential direction, and a plurality of the second insulating papers (insulating papers 1((9) to (16)) are arranged in a manner of circulating in the circumferential direction, and the second insulating papers (insulating papers 1((9) to (16)) adjacent to each other in the circumferential direction overlap each other in the circumferential direction.

The first insulating papers (insulating papers 1((1) to (8)) and the second insulating papers (insulating papers 1((9) to (16)) are deformed into different shapes when being mounted on the stator core 2, but can be formed using the same insulating papers 1. Therefore, the first insulating papers (insulating papers 1((1) to (8))) and the second insulating papers (insulating papers 1((9) to (16))) can be formed by one type of insulating paper 1, and thus the costs can be reduced.

The assembly method for the inter-phase insulating paper of the present embodiment is an assembly method for an inter-phase insulating paper, in which a plurality of first phase coils (U phase coils U), second phase coils (V phase coils V), and third phase coils (W phase coils W) which have different phases from each other are mounted on a stator core 2 in a state of being arranged in a circumferential direction, and a plurality of insulating papers 1 are mounted on the stator core 2 in a manner of circulating in the circumferential direction to perform inter-phase insulation between the first phase coils (U phase coils U), the second phase coils (V phase coils V), and the third phase coils (W phase coils W), the insulating paper 1 including a pair of leg portions 11 to be respectively inserted into a pair of slots 21 among a plurality of slots 21 formed in the stator core 2, and a pair of flat portions 12 connected to the pair of leg portions 11 and protruding from both end surfaces of the stator core 2 in an axial direction to perform the inter-phase insulation of each phase coil, the pair of leg portions 11 being connected to a central portion of an edge of the flat portion 12, a circumferential length of the flat portion 12 being set such that the flat portions 12 of a pair of the insulating papers 1 adjacent to each other overlap each other in the circumferential direction when the insulating papers 1 are mounted on the stator core 2, and the number of the insulating papers 1 to be mounted on the stator core 2 in a manner of circulating in the circumferential direction being set to be the same as the number of a plurality of coils having the same phase mounted on the stator core 2 in a state of being arranged in a manner of circulating in the circumferential direction, the assembly method including: after mounting the first phase coils (U phase coils U) on the stator core 2, inserting the leg portions 11 respectively into a pair of the slots 21 adjacent to each other on which a pair of the second phase coils (V phase coils V) adjacent to each other in the circumferential direction are to be mounted respectively, and bending a portion of the flat portion 12 overlapping the first phase coil (U phase coil U) in the circumferential direction to an inner peripheral side of the stator core 2; and inserting, after the second phase coils (V phase coils V) are mounted on the stator core 2 and before the third phase coils (W phase coils W) are mounted on the stator core 2, the leg portions 11 respectively into a pair of the slots 21 adjacent to each other on which a pair of the third phase coils (W phase coils W) adjacent to each other in the circumferential direction are to be mounted respectively, and bending a portion of the flat portion 12 overlapping the first phase coil (U phase coil U) and the second phase coil (V phase coil V) in the circumferential direction to the inner peripheral side of the stator core 2.

According to the above method, a central portion of the insulating paper 1 in the circumferential direction (the central portion of the flat portion 12 in the circumferential direction and the leg portions 11) are hardly deformed before and after the mounting of the insulating paper 1 on the slot 21, and the pair of leg portions 11 can be reliably inserted into a pair of the slots 21 adjacent to each other, respectively. Accordingly, a restoring force that may be generated due to the deformation of the flat portion 12 and the leg portion 11 can be reduced.

Also, when the flat portion 12 is deformed in accordance with a shape of a coil end of the phase coil, the central portion of the insulating paper 1 in the circumferential direction (the central portion of the flat portion 12 in the circumferential direction and the leg portions 11) is hardly deformed or displaced. Specifically, the leg portion 11 is not deformed such that a width direction of the leg portion 11 faces a groove of the slot 21, and the central portion of the flat portion 12 in the circumferential direction is hardly deformed to the inner peripheral side of the stator core 2, and thus the leg portion 11 is hardly displaced to a groove side of the slot 21. Therefore, protrusion of the leg portion 11 from the groove of the slot 21 can be reduced, and the insulating paper 1 is easily mounted on the slot 21 of the stator core 2.

Although the embodiment of the present invention has been described above, the above embodiment is merely a part of application examples of the present invention, and is not intended to limit the technical scope of the present invention to the specific configurations of the above embodiment. The above embodiment can be combined as appropriate.

The invention claimed is:

1. A motor, wherein:
a plurality of first phase coils, second phase coils, and third phase coils which have different phases from each other are arranged in a stator core in a circumferential direction, and a plurality of insulating papers configured to perform inter-phase insulation of each phase coil are mounted, the insulating paper including a pair of leg portions to be respectively inserted into a pair of slots among a plurality of slots formed in the stator core, and a pair of flat portions connected to the pair of leg portions and protruding from both end surfaces of the stator core in an axial direction to perform the inter-phase insulation of each phase coil, and the pair of leg portions being connected to a central portion of an edge of the flat portion, and being disposed in a manner of sandwiching one tooth disposed between the slots adjacent to each other,
the insulating paper includes:
a first insulating paper in which the leg portions are respectively inserted into a pair of the slots on which a pair of the second phase coils adjacent to each other in the circumferential direction are to be mounted respectively, one side of the flat portion in the circumferential direction is sandwiched between the first phase coil and the second phase coil, and the other side of the flat portion in the circumferential direction is sandwiched between the third phase coil and the first phase coil, and
a second insulating paper disposed on an inner peripheral side of the stator core with respect to the first insulating paper, in which the leg portions are respectively inserted into a pair of the slots on which a pair of the third phase coils adjacent to each other in the circumferential direction are to be mounted respectively, one side of the flat portion in the circumferential direction is sandwiched between the second phase coil and the third phase coil, and the other side of the flat portion in the circumferential direction is sandwiched between the third phase coil and the first phase coil,
a plurality of the first insulating papers are arranged in a manner of circulating in the circumferential direction, and the first insulating papers adjacent to each other in the circumferential direction overlap each other in the circumferential direction, and a plurality of the second insulating papers are arranged in a manner of circulating in the circumferential direction, and the second insulating papers adjacent to each other in the circumferential direction overlap each other in the circumferential direction.

2. The motor according to claim 1, wherein:
when a circumferential length of the flat portion is A and a circumferential displacement amount of a pair of the insulating papers adjacent to each other when the insulating papers are mounted on the stator core is B, the flat portions of the pair of the insulating papers adjacent to each other overlap each other by satisfying a relationship of A>B.

3. The motor according to claim 1, wherein:
the insulating paper has a planar shape before being mounted on the stator core.

4. The motor according to claim 1, wherein:
an elongated hole is formed between the pair of leg portions in accordance with an outer shape of a tooth between a pair of the slots, and the tooth is to be inserted into the elongated hole.

5. The motor according to claim 4, wherein:
a cutout is provided in the flat portion and at a position corresponding to a short side of the elongated hole.

6. The motor according to claim 1, wherein:
the edge of the flat portion facing the stator core when the leg portion is inserted into the slot has an arc shape that extends in a direction orthogonal to a longitudinal direction of the leg portion from a position of the edge corresponding to a base of the leg portion, that is separated from the stator core from an intermediate position to an end of the flat portion, and that is convex in a direction separated from the stator core.

7. The motor according to claim 1, wherein:
the number of the insulating papers to be mounted on the stator core in a manner of circulating in the circumferential direction is set to be the same as the number of a plurality of coils having the same phase mounted on the stator core in a state of being arranged in a manner of circulating in the circumferential direction.

8. An assembly method for an inter-phase insulating paper, in which a plurality of first phase coils, second phase coils, and third phase coils which have different phases from each other are mounted on a stator core in a state of being arranged in a circumferential direction, and a plurality of insulating papers are mounted on the stator core in a manner of circulating in the circumferential direction to perform inter-phase insulation between the first phase coils, the second phase coils, and the third phase coils, the insulating paper including a pair of leg portions to be respectively inserted into a pair of slots among a plurality of slots formed in the stator core, and a pair of flat portions connected to the pair of leg portions and protruding from both end surfaces of the stator core in an axial direction to perform the inter-phase insulation of each phase coil, the pair of leg portions being connected to a central portion of an edge of the flat portion, and being disposed in a manner of sandwiching one tooth disposed between a pair of the slots adjacent to each other, a circumferential length of the flat portion being set such that the flat portions of a pair of the insulating papers adjacent to each other overlap each other in the circumferential direction when the insulating papers are mounted on the stator core, and the number of the insulating papers to be mounted on the stator core in a manner of circulating in the circumferential direction being set to be the same as the number of a plurality of coils having the same phase mounted on the stator core in a state of being arranged in a manner of circulating in the circumferential direction, the assembly method comprising:

after mounting the first phase coils on the stator core and bending each coil end of the first phase to an outer peripheral side of the stator core, inserting the leg portions respectively into a pair of the slots adjacent to each other on which a pair of the second phase coils adjacent to each other in the circumferential direction are to be mounted respectively, and bending a portion of the flat portion overlapping the first phase coil in the circumferential direction to an inner peripheral side of the stator core;

bending each coil end of the second phase coils and a portion of the flat portion facing the coil end to the outer peripheral side of the stator core when mounting the second phase coils to the stator core; and after the second phase coils are mounted on the stator core and before the third phase coils are mounted on the stator core, inserting the leg portions respectively into a pair of the slots adjacent to each other on which a pair of the third phase coils adjacent to each other in the circumferential direction are to be mounted respectively, and bending a portion of the flat portion overlapping the first phase coil and the second phase coil in the circumferential direction to the inner peripheral side of the stator core.

* * * * *